US007381491B2

(12) United States Patent
Seshadri et al.

(10) Patent No.: US 7,381,491 B2
(45) Date of Patent: Jun. 3, 2008

(54) MAXIMIZING PEM FUEL CELL POWER PLANT SYSTEM EFFICIENCY AT OPTIMUM SYSTEM PRESSURE

(75) Inventors: Parthasarathy Seshadri, Manchester, CT (US); Alfred P. Meyer, Simsbury, CT (US); Leslie L. Van Dine, Manchester, CT (US); Thomas M. Clark, Suffield, CT (US)

(73) Assignee: UTC Power Corporation, South Windsor, CT (US)

( * ) Notice: Subject to any disclaimer, the term of this patent is extended or adjusted under 35 U.S.C. 154(b) by 730 days.

(21) Appl. No.: 10/754,298

(22) Filed: Jan. 9, 2004

(65) Prior Publication Data

US 2004/0229103 A1 Nov. 18, 2004

Related U.S. Application Data

(63) Continuation of application No. 10/132,789, filed on Apr. 24, 2002, now abandoned.

(51) Int. Cl.
*H01M 8/04* (2006.01)

(52) U.S. Cl. ............................ 429/25; 429/13; 429/22

(58) Field of Classification Search .................. 429/12, 429/34, 44
See application file for complete search history.

(56) References Cited

U.S. PATENT DOCUMENTS 6,268,074 B1 * 7/2001 Siepierski et al. ............ 429/13

OTHER PUBLICATIONS

Kordesch et al., "Fuel Cells and Their Applications", VCH Publishers, Inc., New York, NY (2001).*

* cited by examiner

*Primary Examiner*—Susy Tsang-Foster
*Assistant Examiner*—Cynthia Lee
(74) *Attorney, Agent, or Firm*—M. P. Williams

(57) ABSTRACT

A PEM fuel cell power plant system (10) has a process air pump (26), which may be a fan, a blower or a compressor, with an adiabatic efficiency of between 40% and 70%. The process air at the inlet 27 of the cathode reactant gas flow field 16 is between 1.07 atmospheres and 1.85 atmospheres, and may be at an optimal pressure for maximum overall system efficiency $$P=\{0.45+2.6E-1.8E^2\}\text{ atms}\pm 0.2\text{ atms}$$

where P is the air inlet pressure and E is the adiabatic efficiency of the process air pump.

4 Claims, 6 Drawing Sheets

1.25atm
1.75atm
1.00atm
1.50atm
2.00atm
1.00atm
1.50atm
2.00atm
1.25atm
1.75atm
0.8
0.7
0.6
0.5
0.4
0.3
0.2
0.1
0.0
GASOLINE
13
14
HYDROGEN
SYSTEM AIR UTILIZATION
80 90 100 110 120 130 140 150 160 170 180 190 200
WATER BALANCED SYSTEM EXHAUST DEWPOINT
(°F)

NUMBER OF CELLS
375
350
325
300
1
1.25
1.5
1.75
2
2.25
SYSTEM PRESSURE
(atm)
ADIABATIC EFF (COMP) = 0.4
ADIABATIC EFF (COMP) = 0.5
ADIABATIC EFF (COMP) = 0.7

MAXIMIZING PEM FUEL CELL POWER PLANT SYSTEM EFFICIENCY AT OPTIMUM SYSTEM PRESSURE

RELATED APPLICATION

This application is a continuation of application Ser. No. 10/132,789 filed Apr. 24, 2002 abandoned.

TECHNICAL FIELD

This invention relates to operation of a proton exchange membrane (PEM) fuel cell power plant at a pressure which is selected to correspond with the adiabatic efficiency of the reactant air pump.

BACKGROUND ART

Heretofore, one type of PEM fuel cell power plant utilizes compressors to pump the reactant air to the cathode reactant gas flow fields, and has typically been operated with air inlet pressures of two or three atmospheres. This takes advantage of the ability of a fuel cell to operate at higher average cell temperatures, exhaust dew point temperatures and coolant temperatures as a consequence of higher operating pressures. Another type of known fuel cell power plant may utilize a fan or blower to provide the reactant air, and consequently works near ambient pressure. While this type of fuel cell power plant cannot take advantage of the efficiencies that result from higher pressure and therefore higher temperature, the overall system efficiency is higher than that of the fuel cell power plants operating at two or three atmospheres with a compressor, due to the extremely low parasitic power required of the blower or fan compared to the parasitic power required by compressors.

It is known that water removal from a fuel cell power plant is controlled by the temperature, pressure and volume of the process exhaust streams leaving the fuel cell power plant. The volume of the process exhaust streams are related to the reactant utilizations and the composition of the fuel used to operate the fuel cell power plant. Process exhaust is defined to be the sum of any exhaust streams from the fuel or oxidant sides of the fuel cell power plant. The fuel stream may be burned prior to exhausting the power plant as is known. The process exhaust from a hydrogen-fueled fuel cell is primarily unreacted air since the fuel utilization approaches 100% to maximize power plant efficiency. The process exhaust from a gasoline-fueled fuel cell includes significant quantities of carbon dioxide and nitrogen, which are by-products of the fuel reforming process. For a partial oxidation reformer, the exhaust volume from the fuel side of the system is approximately equal to exhaust volume from the air side of the system. The greater volume of the process exhaust stream in a gasoline-fueled fuel cell power plant vs. a hydrogen-fueled fuel cell power plant requires a lower system exhaust dew point for the gasoline-fueled fuel cell power plant to maintain water balance.

It is known that the thermodynamic efficiency of PEM fuel cell power plants increases as the fuel and oxidant inlet pressures increase. One of the benefits of higher operating pressure is that it increases the exhaust dew point at which water balance can be maintained, as is illustrated in FIG. 1. In FIG. 1, the leftmost five traces 13 illustrate the exhaust dew point temperature as a function of process exhaust pressure of a gasoline-fueled fuel cell power plant for pressures between one atmosphere and two atmospheres. The rightmost five traces 14 illustrate the increase in system exhaust dew point with increases in process exhaust pressure of a hydrogen-fueled fuel cell power plant for pressures between one atmosphere and two atmospheres. At water balance, water removed in the process exhaust stream is just sufficient to balance the water created at the cathode by the fuel cell process, and leaves adequate water to maintain sufficient humidification of the membrane. Providing process exhaust with the proper dew point, so as to achieve water balance, eliminates the need for additional components such as condensers and enthalpy recovery devices which add weight, volume and complexity to the overall system. When a system is operated essentially at the water balance exhaust dew point, water is nonetheless cooled and returned to the water inlet channels to ensure adequate presence of water thereby permitting water removal to achieve balance. Provision of a higher process exhaust temperature permits operation at a higher cell temperature and coolant temperature, and utilization of a smaller radiator for removal of heat from the coolant to ensure that the water returning to the water flow fields is at a lower temperature than the process exhaust (or operation within higher ambient temperatures), typically reducing overall system cost and weight.

It is known that the overall system efficiency must take into account efficiency of electrical and mechanical components exterior of the fuel cell power plant. In particular, utilizing electricity generated by the fuel cell power plant to operate the pump (fan, blower or compressor) which provides the process air to the fuel cell power plant comprises a significant load of parasitic power consumption. It has heretofore been known that a fuel cell power plant operating at or near ambient pressure utilizing a relatively low power pump has an overall system efficiency which is greater than fuel cell power plants operating at two or three atmospheres, which have higher thermodynamic efficiency, but lower overall system efficiency, due to the increased parasitic power requirement of the required air pump.

DISCLOSURE OF INVENTION

Objects of the invention include provision of a PEM fuel cell power plant: which operates at or near maximum system efficiency; which operates at a system pressure which provides overall maximum system efficiency, taking into account thermodynamic efficiency as well as the adiabatic efficiency of the process air pump; which permits achieving the highest possible water balanced system exhaust dew point consistent with overall system efficiency; and provision of an improved PEM fuel cell power plant.

This invention is predicated on the discovery that the overall efficiency of a fuel cell power plant, including the parasitic power requirements of a process air pump, does not increase with increases in system pressure for any attainable adiabatic efficiency of the pump, but rather that there is a critical system pressure, related to the adiabatic efficiency of the process air pump, at which the efficiency of the overall system is maximal.

According to the present invention, a proton exchange membrane fuel cell power plant utilizes a process air pump which has an adiabatic efficiency, E, of between 40% and 70%, and the system pressure, P, is chosen to be substantially a pressure at which the overall system efficiency is maximal as a function of the adiabatic efficiency of the process air pump. According further to the invention, the system pressure is substantially equal to $$P=\{0.45+2.6E-1.8E^2\} \text{ atms} \pm 0.2 \text{ atms.}$$

As used herein, the term "pump" includes fans, blowers and compressors of all types. By selecting a system pressure as a function of adiabatic efficiency of the process air pump, a fuel cell stack can be composed of a fewer number of cells, without sacrificing any performance; alternatively, a fuel cell stack having a usual number of cells can operate at usual performance with higher efficiency and lower fuel consumption.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
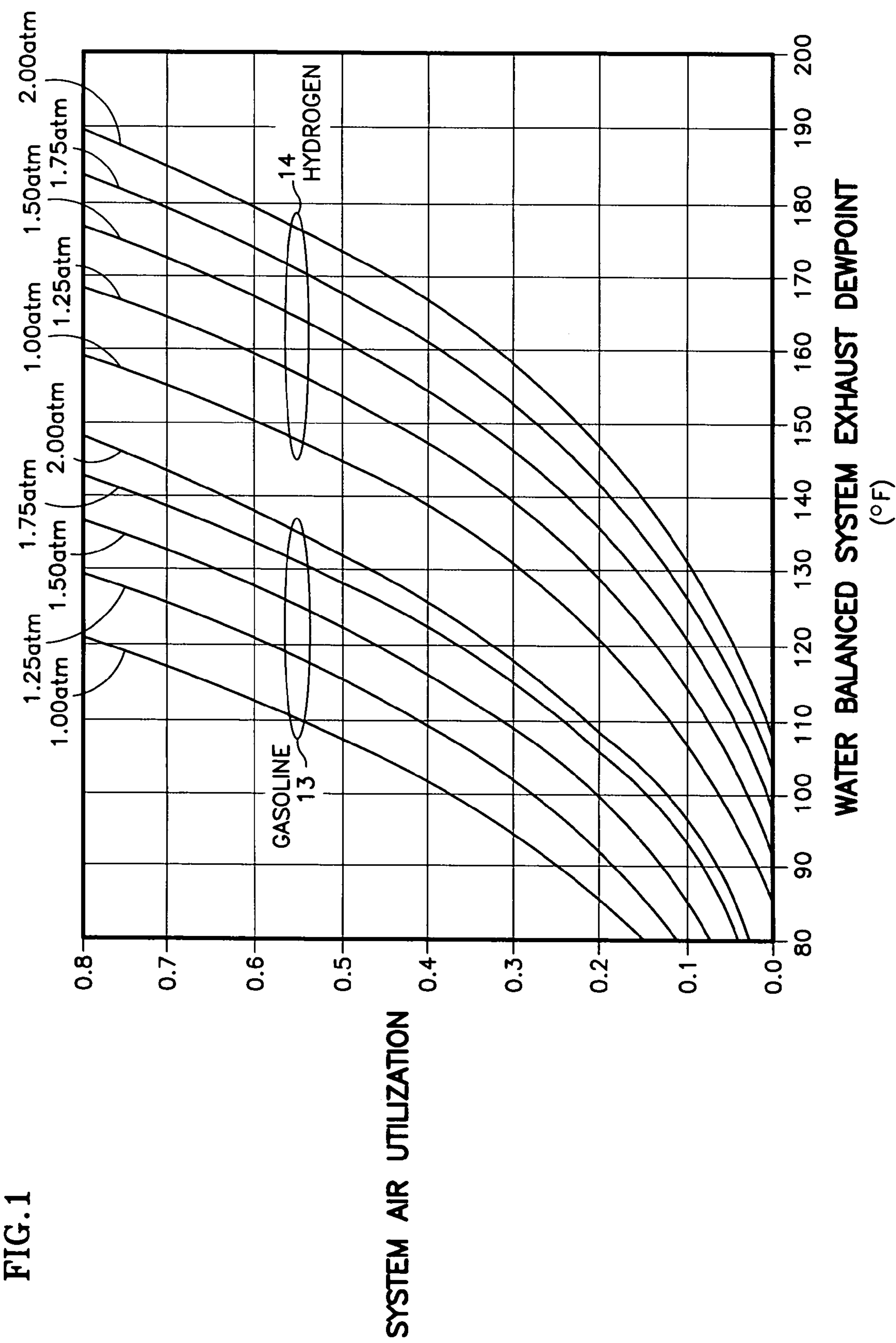
FIG. 1 is a plot of system air utilization for various exhaust dew points that achieve system water balance, for PEM fuel cell power plants fueled with gasoline and for PEM fuel cell power plants fueled with hydrogen, illustrating how water balanced dew point increases with system pressure for any air utilization.
Figure 2:
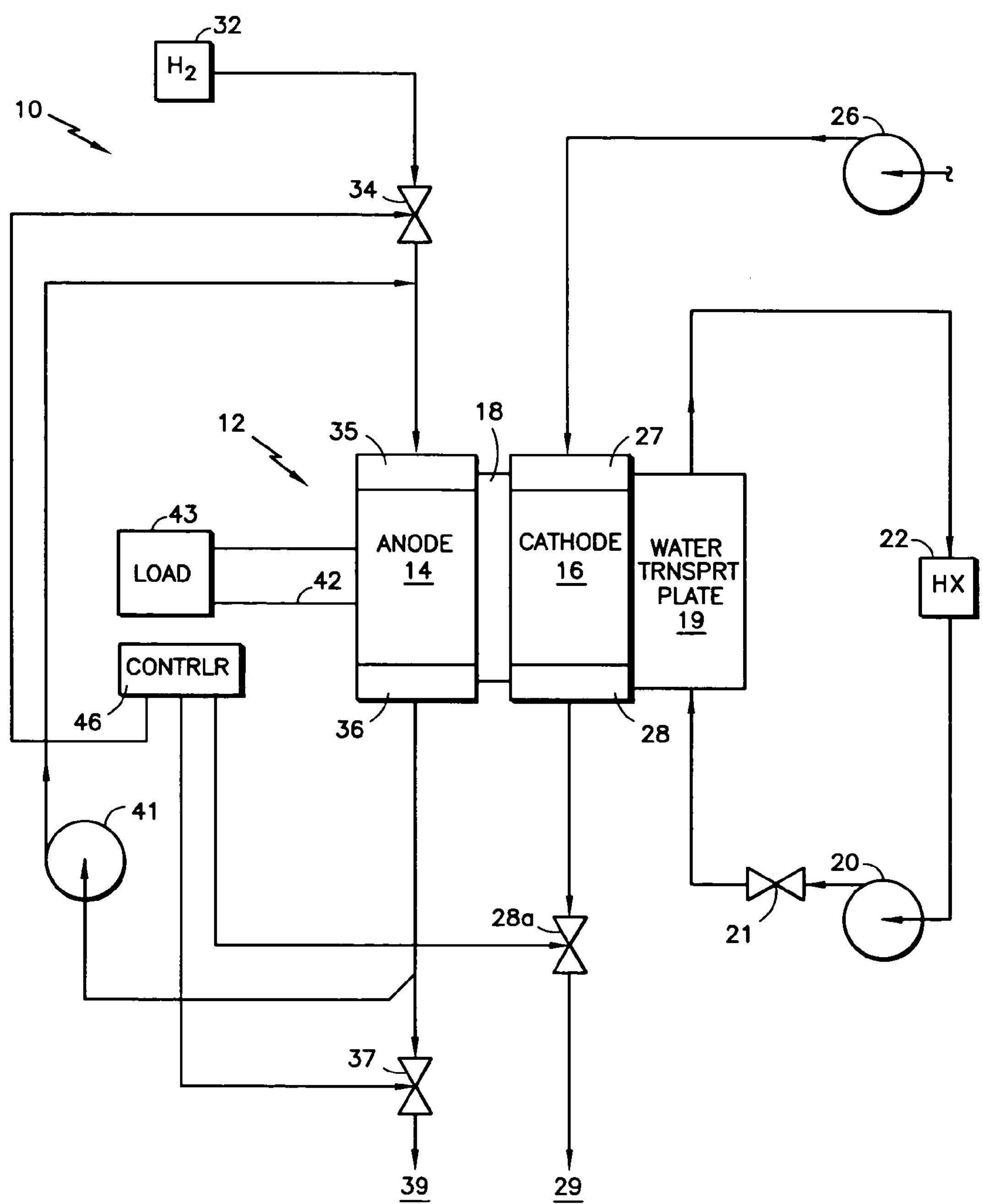
FIG. 2 is a simplified, schematic illustration of an exemplary PEM fuel cell power plant known to the prior art, with which the present invention may be utilized.

Referring to FIG. 2, a fuel cell power plant 10 includes a cell stack assembly 12 which comprises a plurality of individual fuel cells stacked together in contiguous relationship, although only a single cell is illustrated in FIG. 1. A fuel cell includes an anode electrode 14, a cathode electrode 16, and a polymer electrolyte membrane 18 disposed between the electrodes. Each electrode consists of a catalyst, a porous support plate and a reactant flow field as is well known. A water transport plate 19 (or coolant plate), adjacent to the cathode 16, is connected to a coolant control loop including a coolant pump 20, a coolant pressure control valve 21, and a heat exchanger 22. There may be a heat exchange bypass and other water management apparatus, not shown, as disclosed in U.S. Pat. No. 5,503,944. The pump 20 and valve 21 will regulate both the pressure and the volume of flow through the water transport plate 19 and through (or around) the heat exchanger 22. Air is supplied by a blower 26 to a cathode oxidant flow field inlet manifold 27, the depleted air exiting the flow field through an exit manifold 28 and an oxidant pressure control valve **28*a* to exhaust 29. Fuel from a pressurized source 32 of hydrogen, or hydrogen rich gas, passes through a fuel pressure regulator 34, a fuel inlet manifold 35, the fuel flow field of the anode 14, and a fuel exit manifold 36 to a flow control valve 37. The valve 37, when open, vents the fuel flow field to ambient 39 (or any exhaust processor which may be used). The fuel flow field effluent may typically pass through a recycle loop including a blower 41**. The fuel recycle blower typically has a flow rate that is greater than the fuel inlet flow rate in order to maintain a relatively uniform hydrogen composition across the anode flow field.

Current in the power lines 42 feed the load 43 of the fuel cell power plant. A controller 46 may adjust the setting of the hydrogen pressure control valve 34 and the oxidant pressure control valve **28*a*, if desired, to ensure proper flow of reactants to the flow fields. The controller 46 may also control the hydrogen exhaust flow valve 37** so as to purge trace contaminants periodically, such as at a start up or shut down, or otherwise, as is conventional.

Figure 3:
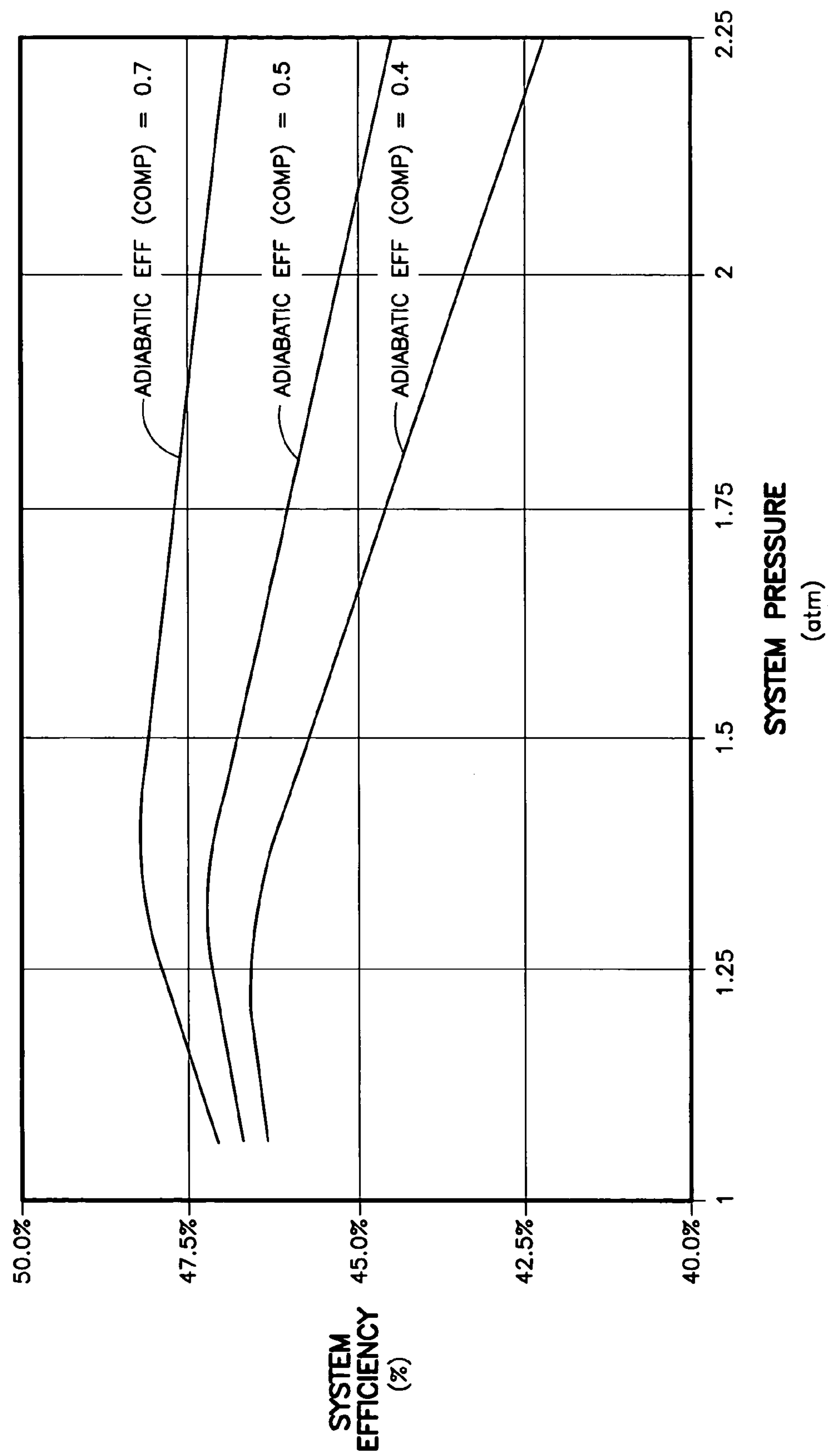
FIG. 3 is a chart of system efficiency as a function of pressure while holding current density constant while the fuel cell stack is configured with a different number of fuel cells, for compressors (or other pumps) having adiabatic efficiency between 0.4 and 0.7, respectively.
Figure 4:
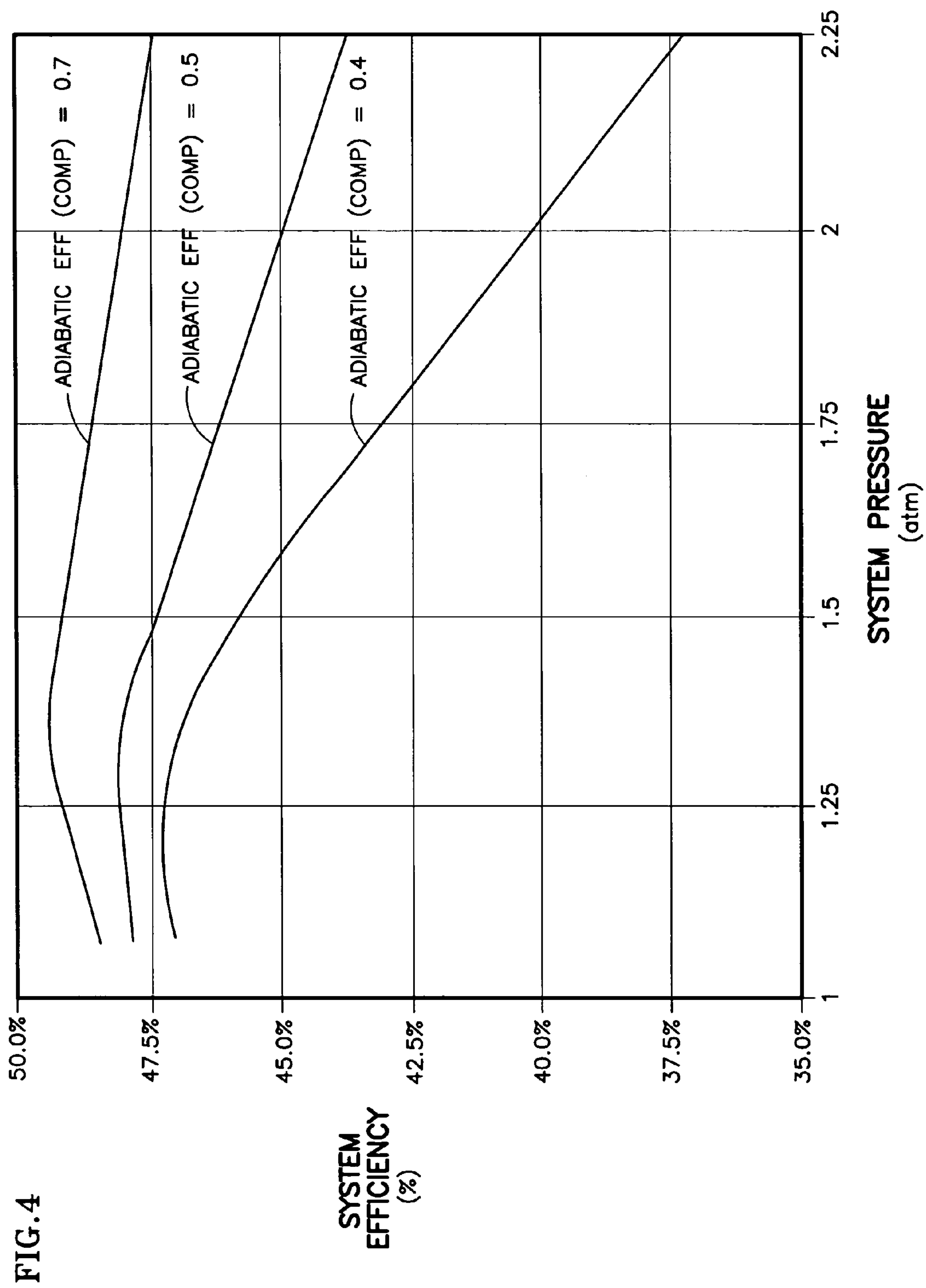
FIG. 4 is a plot of system efficiency as a function of system pressure for a fuel cell stack with a fixed number of fuel cells, while allowing the current density to vary, for compressors (or other pumps) having adiabatic efficiencies of between 0.4 and 0.7, respectively.
Figure 5:
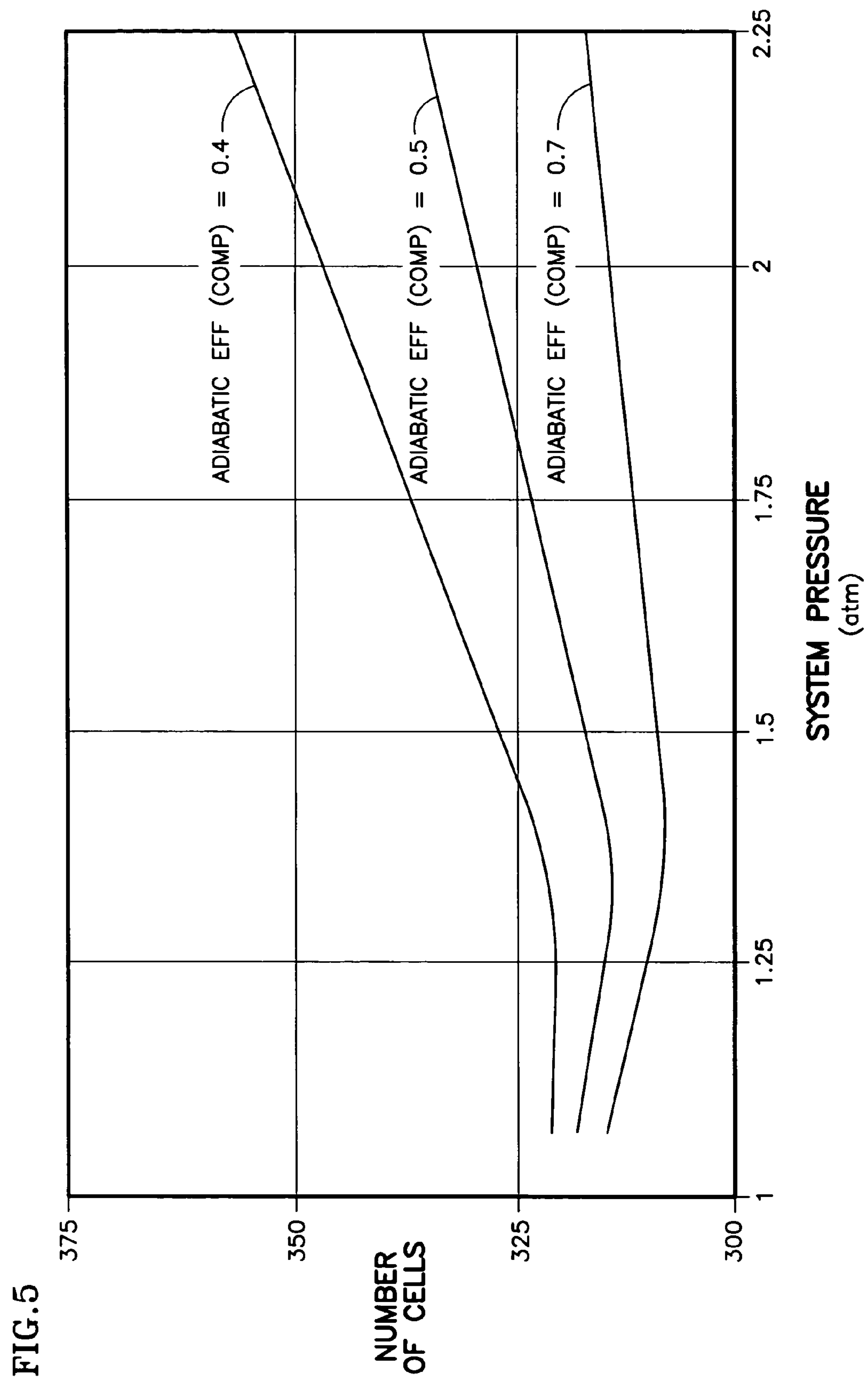
FIG. 5 is a plot of number of cells in a fuel cell stack in order to maintain a given current density as system pressure varies, for compressors (or other pumps) having adiabatic efficiency of between 0.4 and 0.7, respectively.
Figure 6:
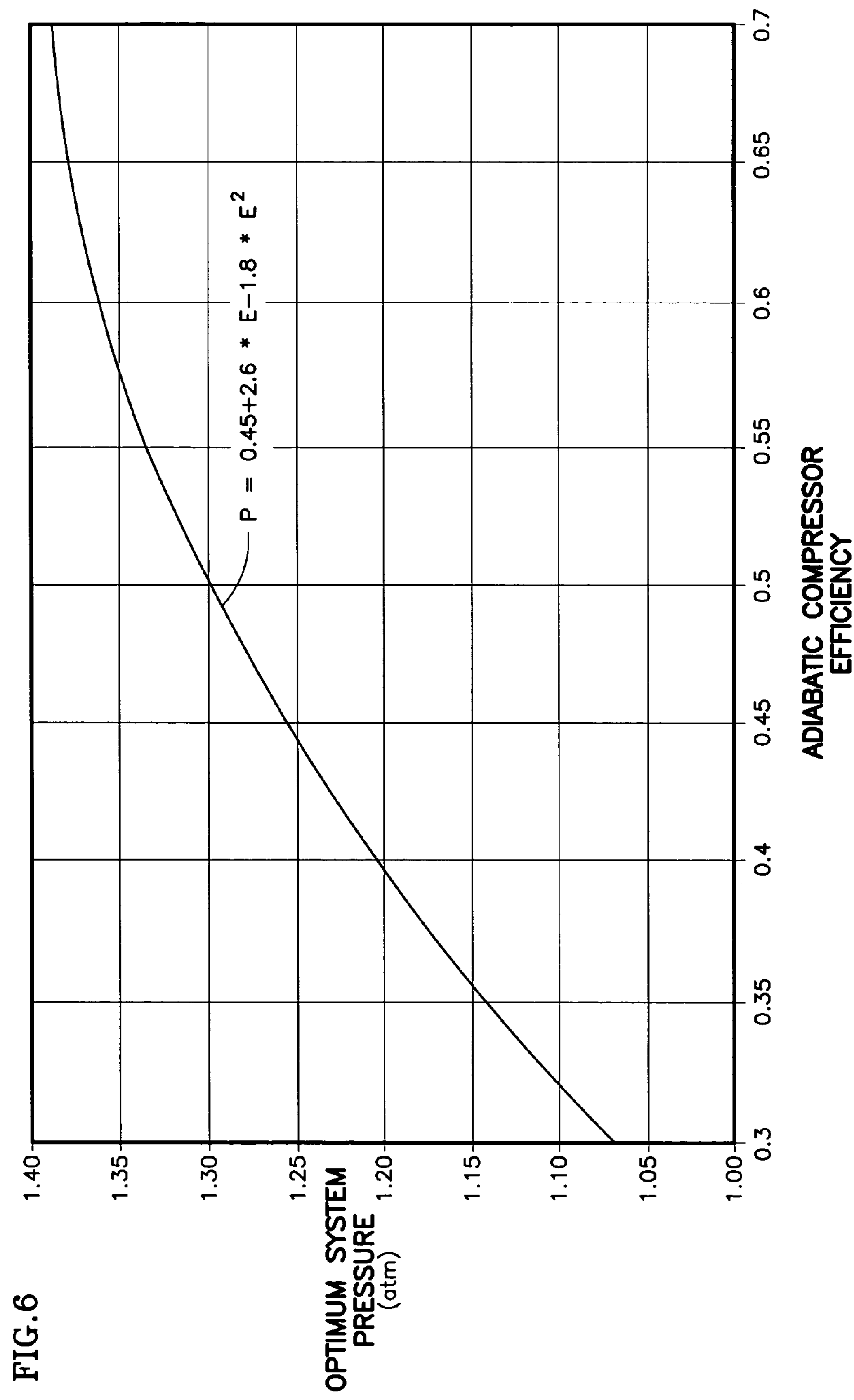
FIG. 6 is a plot of optimum system pressure as a function of adiabatic compressor efficiency.

Calculations of overall system efficiency were made for a fuel cell power plant system of the type generally illustrated in FIG. 2, but which may include cathode air recycling and/or solid coolant plates dispersed between every several cells in the stack, with a net power of 75 kW, and operating with a coolant exit temperature of 85° C., utilizing hydrogen and atmospheric air as the reactants. The calculations were made for such a fuel cell power plant having an air pump (a compressor in this case) with several different adiabatic efficiencies, between 0.3 and 0.7, as the system air inlet pressure was varied from one atmosphere to several atmospheres. For one set of calculations, as the system pressure of the fuel cell power plant was varied, the number of cells in the fuel cell stack was varied in order to cause the current density to remain constant. Results from this set of calculations are illustrated in FIG. 3. For another set of calculations, the number of cells in the fuel cell stack was held constant, and the peak current density was allowed to vary with the system pressure. Results from this set of calculations are illustrated in FIG. 4. From the first set of calculations, the number of fuel cells required to maintain a constant current density, as system pressure (the pressure of air at the inlet to the cathode flow field) varied, is illustrated in FIG. 5. The pressure at which the number of fuel cells is minimal, for the adiabatic pump efficiencies plotted in FIG. 5, is the same as the pressure of maximum system efficiency illustrated in FIG. 3. The optimum system pressure, for maximal system efficiency, for the case illustrated in FIGS. 3 and 5 (constant load current) is illustrated in FIG. 6. It is seen that optimum system pressure is just over 1.30 atmospheres for adiabatic compressor efficiency of 0.5, and about 1.38 atmospheres for adiabatic compressor efficiencies of 0.7.

The aforementioned patent is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fuel cell power plant comprising:

a plurality of fuel cells, each including a proton exchange membrane having a cathode catalyst on a first surface and an anode catalyst on a second surface opposite to said first surface;

a cathode flow field plate adjacent to said cathode catalyst and having an oxidant reactant gas flow field;

an anode flow field plate adjacent to said anode catalyst and having a fuel reactant gas flow field;

a source for providing hydrogen-containing gas to said fuel reactant gas flow field; and an air pump for pumping air from the earth's atmosphere to said oxidant reactant gas flow fields;

characterized by the improvement comprising:

a controller controlling pressure, P, of air provided by said pump to said oxidant reactant gas flow field;

said pump having an adiabatic efficiency, E, of between 0.3 and 0.7 and providing air to said oxidant reactant gas flow fields at a pressure, P, substantially equal to:

$$P=\{0.45+2.6E-1.8E^2\}\text{atms}+0.2\text{ atms.}$$

2. A fuel cell power plant according to claim 1 further comprising:

a valve at an outlet of said oxidant reactant gas flow fields; and said controller for controlling said valve so that said pump provides air to said oxidant reactant gas flow fields at said pressure, P.

3. A method of operating a fuel cell power plant comprising a plurality of fuel cells, each including a proton exchange membrane having a cathode catalyst on a first surface and an anode catalyst on a second surface opposite to said first surface, a cathode flow field plate adjacent to said cathode catalyst and having an oxidant reactant gas flow field, an anode flow field plate adjacent to said anode catalyst and having a fuel reactant gas flow field, and a source for providing hydrogen-containing gas to said fuel reactant gas flow field, said method comprising:

providing an air pump having an adiabatic efficiency, E, of between 0.3 and 0.7 for pumping air from the earth's atmosphere to said oxidant reactant gas flow field; and controlling the pressure, P, of air provided to said oxidant reactant gas flow field by said pump to be substantially equal to:

$$P=\{0.45+2.6E-1.8E^2\}atms\pm0.2atms.$$

4. A method of operating a fuel cell power plant comprising a plurality of fuel cells, each including a proton exchange membrane having a cathode catalyst on a first surface and an anode catalyst on a second surface opposite to said first surface, a cathode flow field plate adjacent to said cathode catalyst and having an oxidant reactant gas flow field, an anode flow field plate adjacent to said anode catalyst and having a fuel reactant gas flow field for receiving a hydrogen-containing gas, said method comprising:

providing air to said oxidant reactant gas flow fields, by means of a pump having an adiabatic efficiency, E, of between 0.3 and 0.7, at a pressure substantially equal to:

$$\{0.45+2.6E-1.8E^2\}\text{atms}\pm0.2\text{atms.}$$

* * * * *